(12) United States Patent
Iwadare et al.

(10) Patent No.: US 10,221,805 B2
(45) Date of Patent: Mar. 5, 2019

(54) CONTROLLER FOR INTERNAL COMBUSTION ENGINE AND CONTROL METHOD FOR INTERNAL COMBUSTION ENGINE

(71) Applicant: HONDA MOTOR CO., LTD., Tokyo (JP)

(72) Inventors: Mitsuhiro Iwadare, Wako (JP); Masanobu Takazawa, Wako (JP); Haruya Kitano, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 15/598,315

(22) Filed: May 18, 2017

(65) Prior Publication Data

US 2017/0363037 A1 Dec. 21, 2017

(30) Foreign Application Priority Data

Jun. 21, 2016 (JP) .................................. 2016-123004

(51) Int. Cl.
*F02D 41/24* (2006.01)
*F02D 41/38* (2006.01)
(Continued)

(52) U.S. Cl.
CPC .......... *F02D 41/401* (2013.01); *F02D 35/028* (2013.01); *F02D 41/0072* (2013.01);
(Continued)

(58) Field of Classification Search
CPC ........ F02D 41/18; F02D 41/26; F02D 41/401; F02D 41/1454; F02D 41/2438;
(Continued)

(56) References Cited

U.S. PATENT DOCUMENTS 6,647,711 B1 * 11/2003 Spiegel ..................... F01N 3/05
60/288
2006/0212140 A1 * 9/2006 Brackney .............. F02D 11/105
700/29

(Continued)

FOREIGN PATENT DOCUMENTS

JP 09-317522 12/1997
JP 2006-144672 6/2006
(Continued)

OTHER PUBLICATIONS

Japanese Office Action for corresponding JP Application No. 2016-123004, dated Feb. 27, 2018 (w/ machine translation).
(Continued)

*Primary Examiner* — Hieu T Vo
*Assistant Examiner* — Arnold Castro
(74) *Attorney, Agent, or Firm* — Mori & Ward, LLP

(57) ABSTRACT

A controller for an internal combustion engine includes a detector and a processor. The detector detects a combustion condition of a gas in a cylinder of the internal combustion engine. The processor is configured to calculate a fuel ratio in the gas in the cylinder. The processor is configured to calculate a target combustion condition according to the fuel ratio. The processor is configured to calculate an ignition timing such that the combustion condition detected by the detector becomes equal to the target combustion condition.

26 Claims, 13 Drawing Sheets

(51) Int. Cl.
- *F02D 41/40* (2006.01)
- *F02D 41/26* (2006.01)
- *F02D 41/14* (2006.01)
- *F02D 35/02* (2006.01)
- *F02D 41/18* (2006.01)
- *F02P 5/15* (2006.01)
- *F02P 5/153* (2006.01)
- *F02D 41/00* (2006.01)

(52) U.S. Cl.
CPC ......... *F02D 41/1454* (2013.01); *F02D 41/18* (2013.01); *F02D 41/2438* (2013.01); *F02D 41/2451* (2013.01); *F02D 41/26* (2013.01); *F02D 41/3836* (2013.01); *F02P 5/153* (2013.01); *F02P 5/1516* (2013.01); *F02D 35/023* (2013.01); *F02D 41/248* (2013.01); *F02D 2041/0015* (2013.01); *F02D 2041/1409* (2013.01); *F02D 2041/389* (2013.01); *F02D 2200/06* (2013.01)

(58) Field of Classification Search
CPC .. F02D 41/3836; F02D 35/023; F02D 35/028; F02D 2041/389; F02D 2041/0015; F02D 2200/06; F02D 37/02
See application file for complete search history.

(56) References Cited

U.S. PATENT DOCUMENTS

| | | | |
|---|---|---|---|
| 2009/0125214 A1* | 5/2009 | Yoshikawa | F02D 41/1454 701/104 |
| 2010/0078000 A1* | 4/2010 | Sakamoto | F01N 3/10 123/672 |
| 2017/0363028 A1* | 12/2017 | Iwadare | F02D 41/1444 |

FOREIGN PATENT DOCUMENTS

| | | |
|---|---|---|
| JP | 2010-203366 | 9/2010 |
| JP | 2015-098838 | 5/2015 |

OTHER PUBLICATIONS

Japanese Office Action for corresponding JP Application No. 2016-123004, dated Dec. 12, 2017.

* cited by examiner

FIG. 6

| NE \ CAIN | CAIN1 · · · · · · · · · · · · CAINj |
|---|---|
| NE1 | IG_BCAIN11 · · · · · · · IG_BCAIN1j |
| ⋮ | ⋮                    ⋮ |
| NEi | IG_BCAINi1 · · · · · · · IG_BCAINij |

FIG. 7

| NE \ R_DL | R_DL1 · · · · · · · · · · · · R_DLj |
|---|---|
| NE1 | IG_BDL11 · · · · · · · IG_BDL1j |
| ⋮ | ⋮                ⋮ |
| NEi | IG_BDLi1 · · · · · · · IG_BDLij |

|   | CAIN | CAIN1 | ⋯⋯⋯⋯ | CAINj |
|---|---|---|---|---|
| NE |  |  |  |  |
| NE1 |  | MFB50_BS11 | ⋯⋯⋯⋯ | MFB50_BS1j |
| ⋮ |  | ⋮ |  | ⋮ |
| NEi |  | MFB50_BSi1 | ⋯⋯⋯⋯ | MFB50_BSij |

CONTROLLER FOR INTERNAL COMBUSTION ENGINE AND CONTROL METHOD FOR INTERNAL COMBUSTION ENGINE

CROSS-REFERENCE TO RELATED APPLICATIONS

The present application claims priority under 35 U.S.C. § 119 to Japanese Patent Application No. 2016-123004, filed Jun. 21, 2016, entitled "Controller for Internal Combustion Engine." The contents of this application are incorporated herein by reference in their entirety.

BACKGROUND

1. Field

The present disclosure relates to a controller for an internal combustion engine and a control method for an internal combustion engine.

2. Description of the Related Art

As a conventional controller of this type for an internal combustion engine, a controller described, for example, in Japanese Unexamined Patent Application Publication No. 9-317522 is known. Using, as a parameter representing the combustion conditions, a burning rate until a crank angle reaches predetermined degrees, the controller calculates a detected burning rate which is an actual value of the burning rate. The controller also sets a target burning rate which is a target value for the burning rate, based on an engine speed and load. Thereby, the controller controls ignition timing and an amount of fuel supplied such that a deviation of the detected burning rate from the target burning rate becomes zero, so that the detected burning rate is controlled to meet the target burning rate to thereby enhance exhaust gas characteristics and fuel mileage.

SUMMARY

According to a first aspect of the present invention, a controller for an internal combustion engine includes a combustion condition parameter obtaining unit, a fuel ratio parameter obtaining unit, a target value setting unit, and an ignition timing calculator. The combustion condition parameter obtaining unit obtains a combustion condition parameter representing a combustion condition of an in-cylinder gas injected into a cylinder in an internal combustion engine. The fuel ratio parameter obtaining unit obtains a fuel ratio parameter representing a fuel ratio of the in-cylinder gas. The target value setting unit sets a target value for the combustion condition parameter depending on the obtained fuel ratio parameter. The ignition timing calculator calculates ignition timing using a feedback control such that the combustion condition parameter becomes equal to the set target value.

According to a second aspect of the present invention, a controller for an internal combustion engine includes an in-cylinder flow controller, a combustion condition parameter obtaining unit, a fuel ratio parameter obtaining unit, a target value setting unit, and a flow control parameter calculator. The in-cylinder flow controller controls strength of a flow of an in-cylinder gas injected into a cylinder in a combustion engine by updating a flow control parameter. The combustion condition parameter obtaining unit obtains a combustion condition parameter representing a combustion condition of the in-cylinder gas. The fuel ratio parameter obtaining unit obtains a fuel ratio parameter representing a fuel ratio of the in-cylinder gas. The target value setting unit sets a target value for the combustion condition parameter depending on the obtained fuel ratio parameter. The flow control parameter calculator calculates the flow control parameter for the in-cylinder flow controller using a feedback control such that the combustion condition parameter becomes equal to the set target value.

According to a third aspect of the present invention, a controller for an internal combustion engine includes a detector and a processor. The detector detects a combustion condition of a gas in a cylinder of the internal combustion engine. The processor is configured to calculate a fuel ratio in the gas in the cylinder. The processor is configured to calculate a target combustion condition according to the fuel ratio. The processor is configured to calculate an ignition timing such that the combustion condition detected by the detector becomes equal to the target combustion condition.

According to a fourth aspect of the present invention, a controller for an internal combustion engine includes a detector, a processor, and a flow controller. The detector to detect a combustion condition of a gas in a cylinder of the internal combustion engine. The processor is configured to calculate a fuel ratio in the gas in the cylinder. The processor is configured to calculate a target combustion condition according to the fuel ratio. The processor is configured to calculate a flow control parameter such that the combustion condition detected by the detector becomes equal to the target combustion condition. The flow controller controls strength of flow of the gas in the cylinder by updating the flow control parameter.

According to a fifth aspect of the present invention, a control method for an internal combustion engine includes calculating a fuel ratio in a gas in a cylinder of the internal combustion engine. A target combustion condition is calculated according to the fuel ratio. An ignition timing is calculated such that a combustion condition of the gas in the cylinder becomes equal to the target combustion condition.

According to a sixth aspect of the present invention, a control method for an internal combustion engine includes calculating a fuel ratio in a gas in a cylinder of the internal combustion engine. A target combustion condition is calculated according to the fuel ratio. A flow control parameter is calculated such that the combustion condition of the gas in the cylinder becomes equal to the target combustion condition. Strength of flow of the gas in the cylinder is controlled by updating the flow control parameter.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 6 is a basic map for calculating a basic map value for the base value of the ignition timing.

FIG. 7 is a dilution correction map for calculating a dilution correction term for the base value of the ignition timing.

DESCRIPTION OF THE EMBODIMENTS

Figure 1:
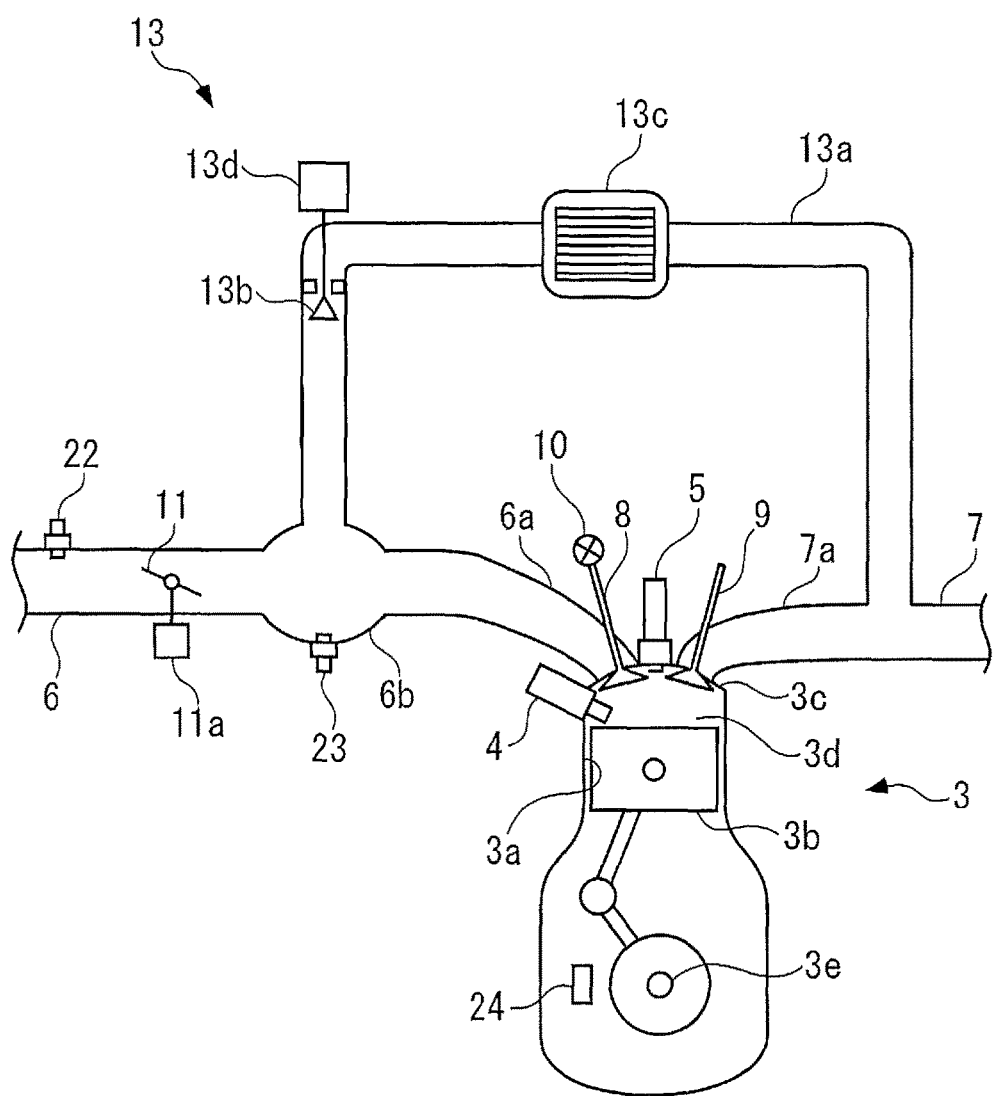
FIG. 1 is a diagram schematically illustrating an internal combustion engine to which a controller related to the present disclosure is applied.

The embodiments will now be described with reference to the accompanying drawings, wherein like reference numerals designate corresponding or identical elements throughout the various drawings.

Referring to the drawings, detailed descriptions will be hereinbelow provided for preferred embodiments. FIG. 1 illustrates an internal combustion engine (hereinafter referred to as an "engine") 3 to which the present disclosure is applied. The engine 3 is, for example, a four-cylinder gasoline engine installed in a vehicle (not illustrated). The engine 3 is configured to perform a stoichiometric combustion operation in which the air-fuel ratio is a theoretical air-fuel ratio, and a lean combustion operation in which the air-fuel ratio is variable up to a very lean ratio (air-fuel ratio=32, for example).

In each cylinder 3a (only one cylinder is illustrated), a combustion chamber 3d is formed between a piston 3b and a cylinder head 3c. In each cylinder 3a, the cylinder head 3c is provided with a fuel injection valve 4 and an ignition plug 5. The fuel injection valve 4 is of a type which directly injects fuel into the combustion chamber 3d. An electronic control unit (ECU) 2 (see FIG. 2) controls a valve open time of the fuel injection valve 4, and thereby controls a fuel injection quantity GFUEL. The ignition plug 5 generates sparks by electrical discharge to ignite an in-cylinder gas inside the combustion chamber 3d. The ignition timing IG of the ignition plug 5 (timing at which sparks are generated) is controlled by the ECU 2.

It should be noted that the "in-cylinder gas" means a gas to be injected into the cylinder 3a and supplied for the combustion. In a case where EGR, which will be discussed later, is performed, the in-cylinder gas is a mixture of air (fresh air), an EGR gas and the fuel. In a case where no EGR is performed, the in-cylinder gas is a mixture of air and the fuel.

Figure 2:
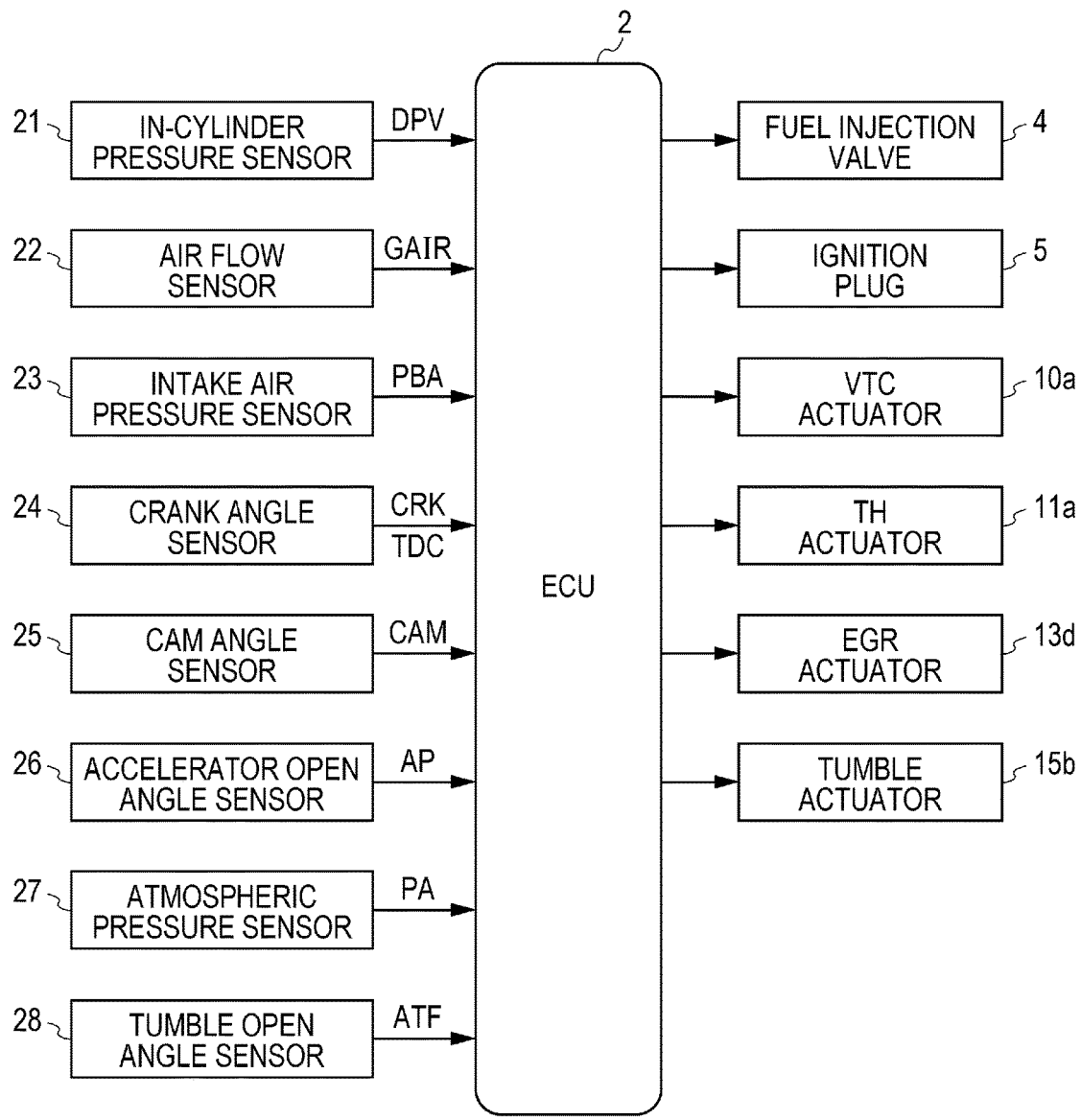
FIG. 2 is a block diagram illustrating the controller.

The fuel injection valve 4 is integrally provided with an in-cylinder pressure sensor 21 (see FIG. 2). The in-cylinder pressure sensor 21 is formed from a ring-shaped piezoelectric element, and is disposed surrounding an injection hole (not illustrated) of the fuel injection valve 4. The in-cylinder pressure sensor 21 outputs to the ECU 2 a detection signal representing an amount DPV of change in the pressure inside the cylinder 3a (hereinafter referred to as a "pressure change amount DPV"). Based on the pressure change amount DPV, the ECU 2 calculates a pressure PCYL inside the cylinder 3a (hereinafter referred to as an "in-cylinder pressure PCYL").

An intake pipe 6 and an exhaust pipe 7 are connected to the cylinder head 3c, and provided with an intake valve 8 for opening and closing an intake port 6a and an exhaust valve 9 for opening and closing an exhaust port 7a. In addition, an intake camshaft (not illustrated) for driving the intake valve 8 is provided with an intake phase varying mechanism 10.

The intake phase varying mechanism 10 continuously varies (shifts) the opening/closing timing of the intake valve 8 by continuously changing a phase CAIN of the intake camshaft relative to a crankshaft 3e (hereinafter referred to as an "intake phase CAIN"). The intake phase CAIN is controlled by the driving of a control shaft (not illustrated) of the intake phase varying mechanism 10 by a VTC actuator 10a (see FIG. 2). The operation of the VTC actuator 10a is controlled by the ECU 2.

A throttle valve 11 is provided upstream of an intake collector 6b of the intake pipe 6. The throttle valve 11 is rotatably provided inside the intake pipe 6, and is connected to a TH actuator 11a. An open angle of the throttle valve 11 is controlled by the controlling of the operation of the TH actuator 11a by the ECU 2. Thereby, an amount GAIR of intake air (fresh air) to be taken into the combustion chamber 3d (hereinafter referred to as an "intake air amount GAIR") is controlled.

Furthermore, the engine 3 is provided with an EGR system 13 for recirculating part of an exhaust gas, exhausted from the combustion chamber 3d to the exhaust pipe 7, to the intake pipe 6 to use the part of the exhaust gas as the EGR gas. The EGR system 13 is formed from components such as an EGR passage 13a, an EGR valve 13b provided in a middle of the EGR passage 13a, and an EGR cooler 13c for cooling the EGR gas. The EGR passage 13a is connected to the exhaust pipe 7 and the intake collector 6b of the intake pipe 6.

The EGR valve 13b is provided inside the EGR passage 13a in a way that makes EGR valve 13b movable backward and forward, and is linked to an EGR actuator 13d. An amount of lift of the EGR valve 13b is controlled by the controlling of the operation of the EGR actuator 13d by the ECU 2. Thereby, an amount GEGR of EGR gas to be recirculated to the intake pipe 6 (hereinafter referred to as an "EGR amount GEGR") is controlled.

Upstream of the throttle valve 11, the intake pipe 6 is provided with an air flow sensor 22. The intake collector 6b downstream of the throttle valve 11 is provided with an intake air pressure sensor 23. The air flow sensor 22 detects the intake air amount GAIR, while the intake air pressure sensor 23 detects a pressure PBA inside the intake pipe 6 (hereinafter referred to as an "intake air pressure PBA"). The air flow sensor 22 and the intake air pressure sensor 23 output signals representing their detections to the ECU 2.

The crankshaft 3e of the engine 3 is provided with a crank angle sensor 24. In response to rotations of the crankshaft 3e, the crank angle sensor 24 outputs a CRK signal and a TDC signal, which are pulse signals, to the ECU 2.

Each time the crank angle changes by a predetermined number of degrees (for example, by 1 degree), the crank angle sensor 24 outputs the CRK signal. Based on the CRK signal, the ECU 2 calculates the number NE of revolutions of the engine 3 (hereinafter referred to as an "engine speed NE"). The TDC signal indicates that in one of the cylinders 3a, the piston 3b is at the top death center (TDC) where the piston 3b starts an intake stroke. In the case where like in the embodiment, the engine 3 has four cylinders, the TDC signal is outputted each time the crank angle changes by 180 degrees. Based on the TDC signal and the CRK signal, the ECU 2 calculates the crank angle CA (BTDC) by using each signal generation timing as a reference (=0); and defining a positive angle as an angle in an advance angle direction.

Meanwhile, the intake camshaft is provided with a cam angle sensor 25. In response to rotations of the intake cam shaft, each time the cam angle changes by a predetermined number of degrees (for example, 1 degree), the cam angle sensor 25 outputs a CAM signal, which is a pulse signal, to the ECU 2. Based on the CAM signal and the CRK signal, the ECU 2 calculates the intake phase CAIN.

Furthermore, from an accelerator open angle sensor 26, the ECU 2 receives a detection signal representing an accelerator open angle AP which is associated with how much an accelerator pedal (not illustrated) is depressed. From an atmospheric pressure sensor 27, the ECU 2 receives a detection signal representing an atmospheric pressure PA.

The ECU 2 is implemented using a microcomputer including an I/O interface, a CPU, a RAM and a ROM. Depending on the detection signals from the respective sensors 21 to 27, the ECU 2 recognizes the operating condition and combustion condition of the engine 3, and in the first embodiment, further performs a process of calculating the ignition timing in order to control the combustion condition.

In the embodiment, the ECU 2 functions as a combustion condition parameter obtaining unit, a fuel ratio parameter obtaining unit, a target value setting unit, an ignition timing calculator, a storage, and a base value update unit.

Figure 3:
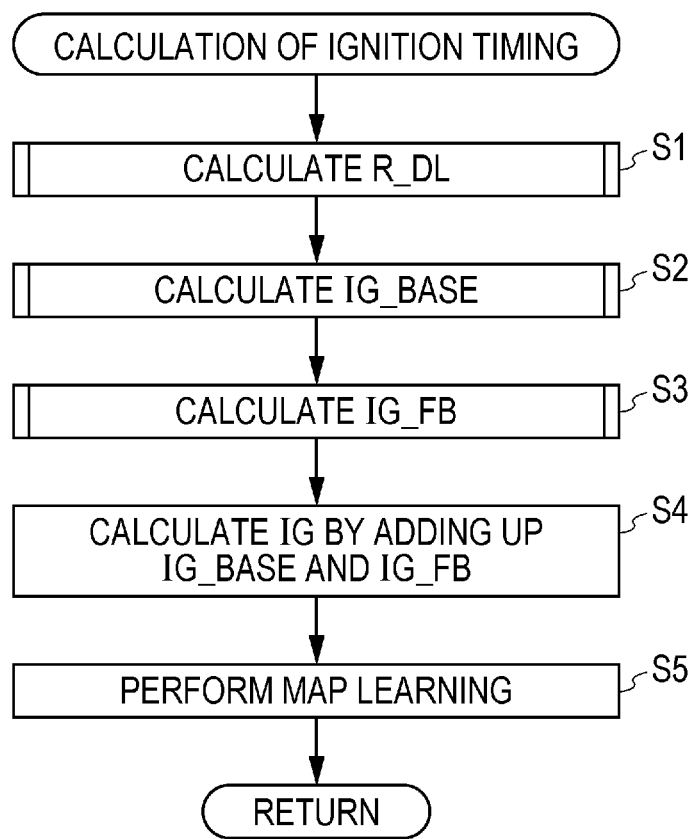
FIG. 3 is a flowchart illustrating a main flow of a process of calculating ignition timing in a first embodiment.

FIG. 3 illustrates the process of calculating the ignition timing. The process calculates the ignition timing IG by using MFB50 (referring to a crank angle at which the mass fraction of burned fuel (MFB) is 50%) as a combustion condition parameter representing the combustion condition; and performing feedback control such that an actual MFB50, which is an actual value of MFB50, becomes equal to a target MFB50. This process is carried out for each cylinder 3a in synchronism with the generation of the TDC signal.

Figure 4:
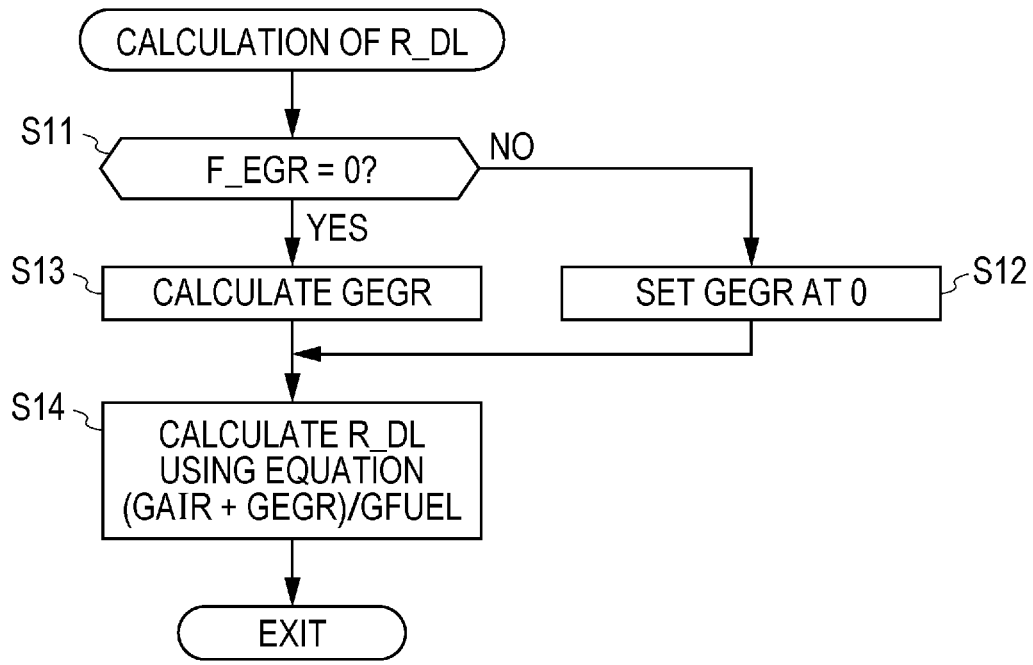
FIG. 4 is a flowchart illustrating a process of calculating a dilution ratio.

This process begins with step S1 (denoted by S1 in FIG. 3, where the same is the case with the other steps), where a dilution ratio R_DL of the in-cylinder gas is calculated as a fuel ratio parameter representing a ratio of the fuel to the in-cylinder gas. FIG. 4 illustrates a subroutine for the calculation process. The calculation process begins with step S11, where it is determined whether an EGR flag F_EGR is 1 (one). The EGR flag F_EGR is set at 1 while the EGR system 13 is performing the EGR. If an answer in step S11 is NO, that is to say, if the EGR system 13 is not performing the EGR, the EGR amount GEGR is set at 0 (zero) (in step S12).

If the answer in step S11 is YES, that is to say, if the EGR system 13 is performing the EGR, the EGR amount GEGR is calculated (in step S13). The calculation of the EGR amount GEGR is performed by: using the detected atmospheric pressure PA and the detected intake air pressure PBA, respectively, as pressures upstream and downstream of the EGR valve 13b; and applying the orifice equation to the EGR valve 13b.

Thereafter, using the EGR amount GEGR, the intake air amount GAIR and the fuel injection quantity GFUEL, the dilution ratio R_DL is calculated using an equation expressed with $$R\_DL=(GAIR+GEGR)/GRUEL \quad (1)$$

(in step S14), and the process is terminated.

As expressed above, the dilution ratio R_DL is defined as a ratio of a sum of the amount of the air and the EGR amount to the quantity of the fuel in the in-cylinder gas. A larger value of the dilution ratio R_DL means a lower fuel ratio of the in-cylinder gas. In addition, while the EGR is not performed (GEGR=0), the dilution ratio R_DL is equal to the air-fuel ratio AF.

Figure 5:
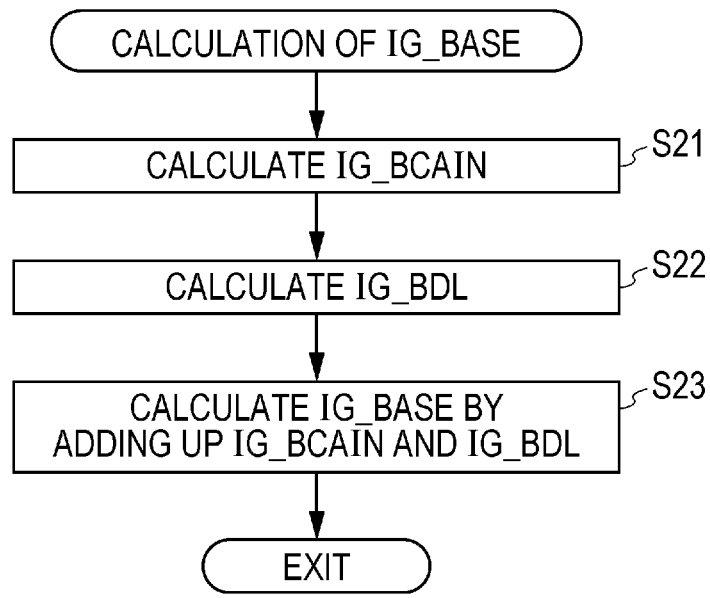
FIG. 5 is a flowchart illustrating a process of calculating a base value of the ignition timing.

Returning to FIG. 3, in step S2 following step S1, a base value IG_BASE of the ignition timing IG is calculated. The base value IG_BASE is a feedforward term against a feedback correction term IG_FB, which will be discussed later. FIG. 5 illustrates a subroutine for the calculation process. This process begins with step S21, where a base map value IG_BCAIN is calculated by searching a base map, illustrated in FIG. 6, depending on the engine speed NE and the intake phase CAIN. This base map value IG_BCAIN is set under the condition that: the air-fuel ratio is equal to the theoretical air-fuel ratio; and no EGR is performed, and the in-cylinder gas is not diluted with the EGR gas (EGR amount GEGR=0).

Thereafter, a dilution correction term IG_BDL is calculated by searching a dilution correction map, illustrated in FIG. 7, depending on the engine speed NE and the dilution ratio R_DL calculated in step S1 (in step S22). In this dilution correction map, the dilution correction term IG_BDL is set at a larger value (in the advance angle direction) as the dilution ratio R_DL becomes higher. This is because: a higher dilution ratio R_DL makes the in-cylinder gas harder to ignite, and the ignition delay longer; and accordingly, the ignition operation is started earlier by correcting the ignition timing IG in the advance angle direction.

Subsequently, the base value IG_BASE of the ignition timing IG is calculated by adding the dilution correction term IG_BDL to the base map value IG_BCAIN (in step S23), and the process is terminated.

Figure 8:
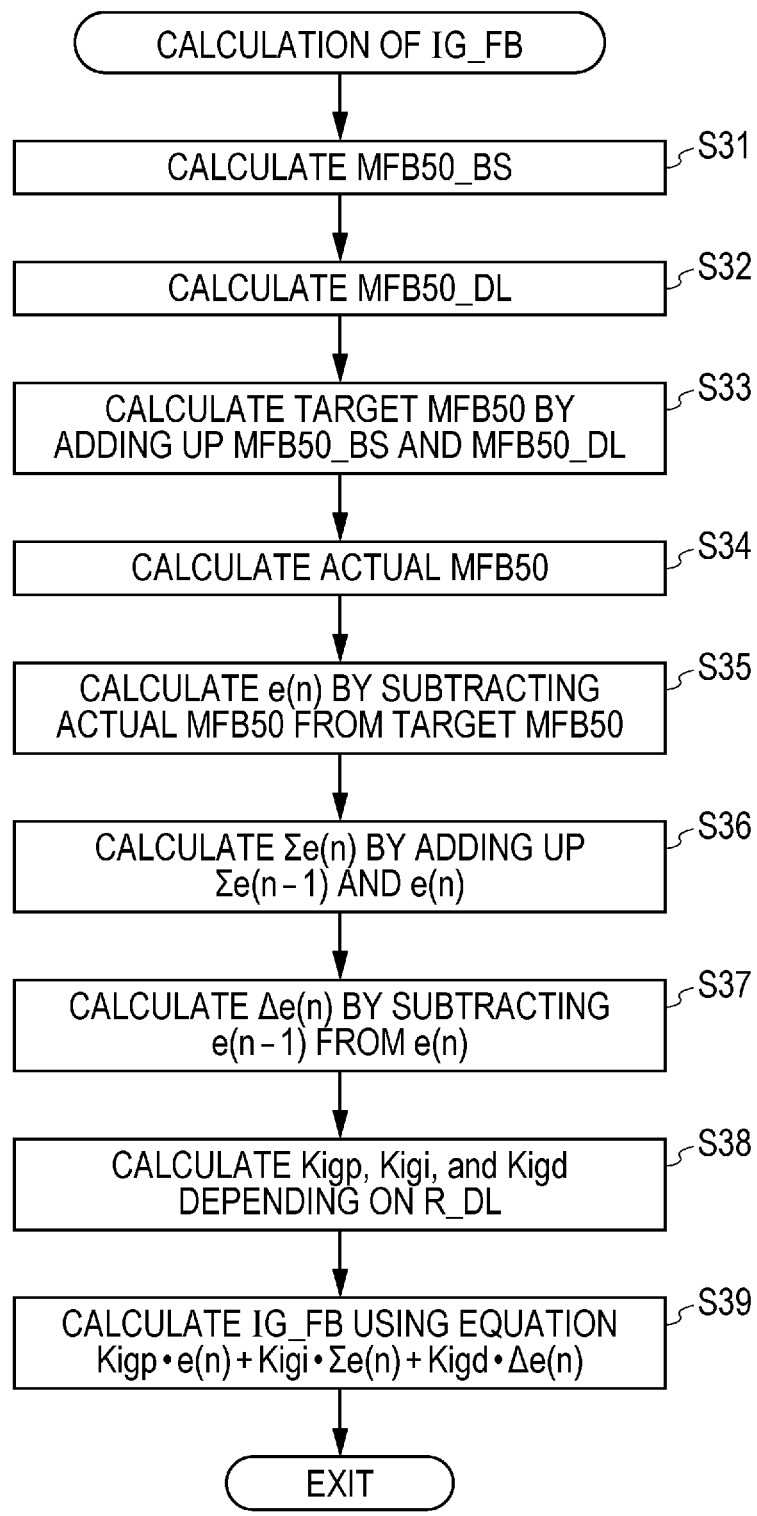
FIG. 8 is a flowchart illustrating a process of calculating a feedback correction term for the ignition timing.

Returning to FIG. 3, in step S3 following step S2, the feedback correction term IG_FB for the ignition timing IG is calculated. FIG. 8 illustrates a subroutine for the calculation process. This process begins with step S31, where a base map value MFB50_BS of the target MFB50 is calculated by searching a base map, illustrated in FIG. 9, depending on the engine speed NE and the intake phase CAIN. The base map value MFB50_BS is set under the condition that: the air-fuel ratio is equal to the theoretical air-fuel ratio; and no EGR is performed, and the in-cylinder gas is not diluted with the EGR gas.

Figures 9, 10:
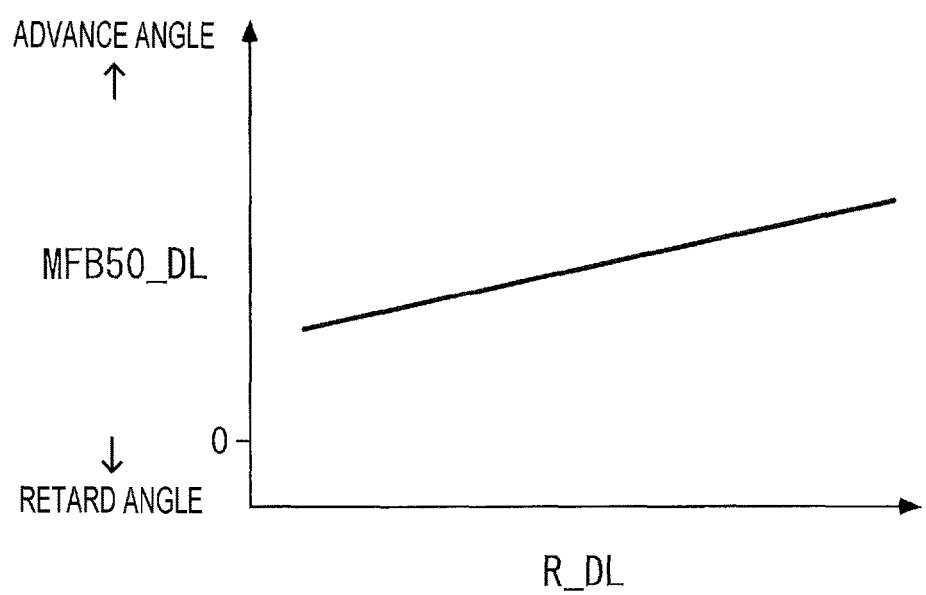
FIG. 9 is a base map for calculating a base map value for a target.
FIG. 10 is a table for calculating a dilution correction term for the target.

Thereafter, a dilution correction term MFB50_DL for the target MFB50 is calculated by searching a dilution correction table, illustrated in FIG. 10, depending on the dilution ratio R_DL (in step S32). In the dilution correction table, the dilution correction term MFB50_DL is set at a larger value (in the advance angle direction) as the dilution ratio R_DL becomes higher. This is because the target MFB50 is corrected to a larger value in the advance angle direction since the burning velocity tends to become lower as the dilution ratio R_DL becomes higher.

Subsequently, the target MFB50 is calculated by adding the dilution correction term MFB50_DL to the base map value MFB50_BS (in step S33).

After that, in step S34, the actual MFB50 is calculated. Based on a result of the detection by the in-cylinder pressure sensor 21, the calculation of the actual MFB50 is achieved as follows. To begin with, the in-cylinder pressure PCYL is calculated by integrating the pressure change amount DPV detected by the in-cylinder pressure sensor 21. Furthermore, a rate of change in the in-cylinder volume, the in-cylinder volume, and a rate of change in the in-cylinder pressure are calculated using the CRK signal and the TDC signal. These four parameters are calculated each time the crank angle changes by a predetermined unit number of degrees associated with the generation cycle of the CRK signal. Thereafter, using the four thus-calculated parameters and a specific heat ratio, a heat generation rate $dQ\theta$ is calculated using a predetermined equation each time the crank angle changes by the predetermined unit number of degrees. After that, by integrating the thus-calculated heat generation rate $dQ\theta$, a generated heat quantity is calculated each time the crank angle changes by the predetermined unit number of degrees. Hence, for each combustion cycle, the crank angle CA at which the thus-calculated generated heat quantity becomes equal to 50% of the total generated heat quantity is calculated as the actual MFB50.

In step S35 following step S34, a deviation $e(n)$ of the actual MFB50 from the target MFB50 is calculated. Furthermore, a sum value $\Sigma e(n)$ of the deviation $e(n)$ is calculated by adding the current deviation $e(n)$ to the previous sum value $\Sigma e(n-1)$ (in step S36), while a difference between the current deviation $e(n)$ and the previous deviation $e(n-1)$ is calculated as an amount $\Delta e(n)$ of change in the deviation (hereinafter referred to as a "deviation change amount $\Delta e(n)$") (in step S37).

Figure 11:
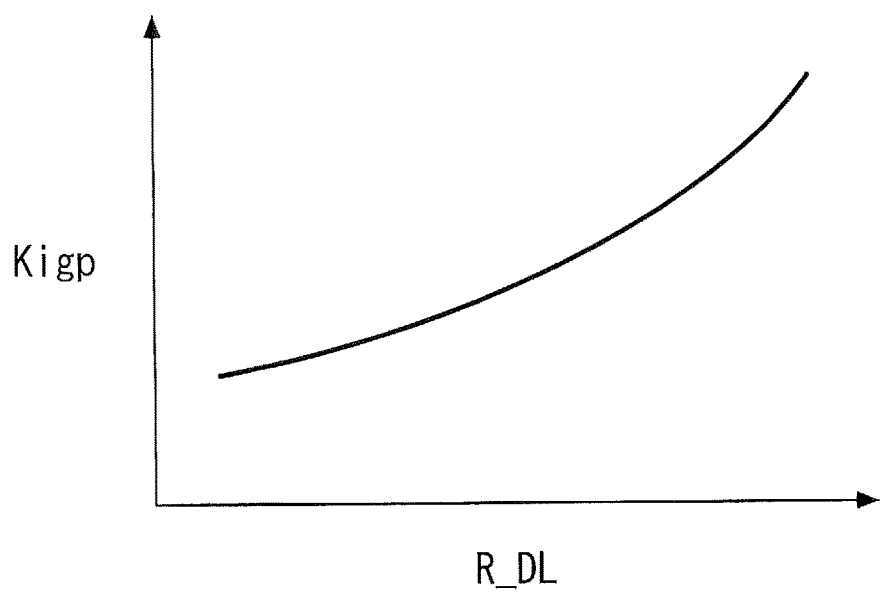
FIG. 11 is a table for calculating a P term gain in a feedback control for calculating the ignition timing.

Thereafter, a P term gain Kigp, an I term gain Kigi and a D term gain Kigd for calculating the ignition timing IG are calculated by searching the respective predetermined tables depending on the dilution ratio R_DL (in step S38). In a table shown as an example in FIG. 11, for the purpose of enhancing the responsiveness of the feedback control, the P term gain Kigp is set at a larger value as the dilution ratio R_DL becomes larger. For the same reason, each of the I term gain Kigi and the D term gain Kigd, albeit not illustrated, is also set at a larger value as the dilution ratio R_DL becomes larger.

Subsequently, using the thus-calculated gains Kigp, Kigi, Kigd, the feedback correction term IG_FB for the ignition timing IG is calculated using an equation expressed with $$IG\_FB = Kigp \cdot e(n) + Kigi \cdot \Sigma e(n) + Kigd \cdot \Delta e(n) \quad (2)$$

(in step S39), and the process is terminated.

Returning to FIG. 3, in step S4 following step S3 discussed above, the ignition timing IG is calculated by adding the feedback correction term IG_FB to the base value IG_BASE.

Figure 12:
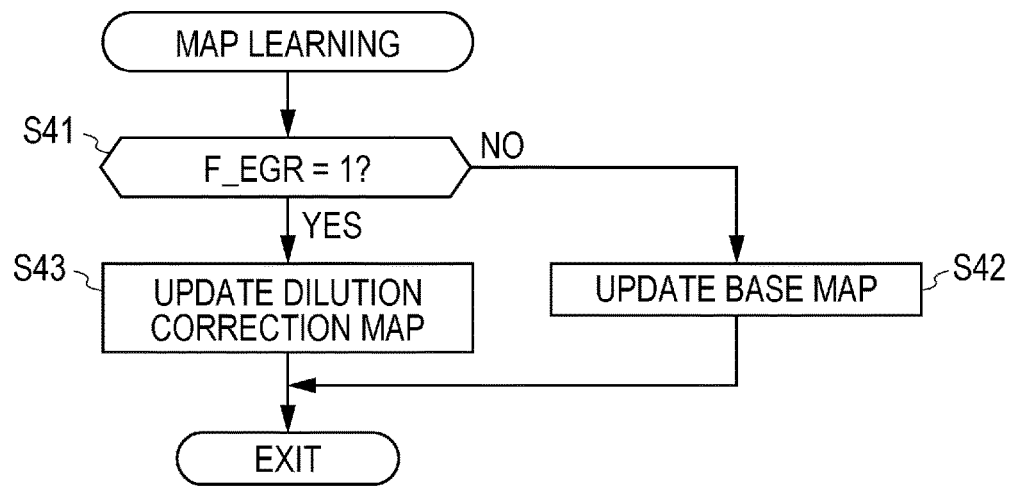
FIG. 12 is a flowchart illustrating a map learning process.

Eventually, map learning is carried out (in step S5), and the process is terminated. The purpose of the learning process is to update one of the base map illustrated in FIG. 6 and the dilution correction map illustrated in FIG. 7, which are used to calculate the base value IG_BASE of the ignition timing IG. FIG. 12 illustrates a subroutine for the learning process.

This process begins with step S41, where it is determined whether the EGR flag F_EGR is 1 (one). If an answer in step 41 is NO, that is to say, if the in-cylinder gas is not diluted with the EGR gas, the base map is updated (in step S42), and the process is terminated. The updating of the base map is achieved, for example, by: multiplying the currently-calculated feedback correction term IG_FB by a predetermined coefficient KL1 (0<KL1<1); and adding the multiplication value IG_FB·KL1 to a map value IG_BCAINij associated with the current engine speed NE and intake phase CAIN in the base map.

On the other hand, if the answer in step S41 is YES, that is to say, if the in-cylinder gas is diluted with the EGR gas, the dilution correction map is updated (in step S43), and the process is terminated. The updating of the dilution correction map is achieved, for example, by adding the multiplication value IG_FB·KL1 to a map value IG_BDLij associated with the current engine speed NE and dilution ratio R_DL in the dilution correction map. The thus-updated base map or dilution correction map is used in the subsequent process cycle(s).

As discussed above, in the embodiment, using the MFB50 as the combustion condition parameter, the actual MFB50, which is the actual value of the MFB50, is calculated based on the result of the detection by the in-cylinder pressure sensor 21 and the like, as well as the target MFB50, which is the target value for the MFB50, is set. Thereafter, the ignition timing IG is calculated using the feedback control such that the actual MFB50 becomes equal to the target MFB50. Accordingly, the actual MFB50 can be accurately controlled such that the actual MFB50 becomes equal to the target MFB50.

Furthermore, the target MFB50 is set as the sum of the base map value MFB50_BS and the dilution correction term MFB50_DL. The dilution correction term MFB50_DL is calculated to a larger value in the advance angle direction as the dilution ratio R_DL becomes larger, that is to say, as the fuel ratio of the in-cylinder gas becomes lower. Thereby, the target MFB50 can be appropriately set such that a decrease in the burning velocity due to the decrease in the fuel ratio of the in-cylinder gas is compensated for. Moreover, the base map value MFB50_BS is calculated depending on the engine speed NE and the intake phase CAIN. Accordingly, the target MFB50 can be appropriately set depending on the fuel ratio of the in-cylinder gas and the operating condition of the engine 3. Thus, the fuel mileage and the exhaust gas characteristics can be enhanced.

Besides, the ignition timing IG is calculated as the sum of the base value IG_BASE as the feedforward term and the feedback correction term IG_FB which is calculated such that the actual MFB50 becomes equal to the target MFB50. In addition, the base value IG_BASE is calculated as the sum of the base map value IG_BCAIN and the dilution correction term IG_BDL, and the dilution correction term IG_BDL is calculated to a larger value (in the advance angle direction) as the dilution ratio R_DL becomes larger. Thereby, it is possible to appropriately calculate the base value IG_BASE of the ignition timing IG while reflecting the ignition delay depending on the fuel ratio, and to enhance the responsiveness of the ignition timing IG-based feedback control using the base value IG_BASE and the feedback correction term IG_FB.

In addition, the base map value IG_BCAIN stored in the base map, or the dilution correction term IG_BDL stored in the dilution correction map is updated based on the feedback correction term IG_FB. Thereby, it is possible to appropriately correct the deviation of the base value IG_BASE from the proper value, and to enhance the responsiveness of the ignition timing IG-based feedback control further.

Next, descriptions will be provided for a second embodiment related to the present disclosure. The second embodiment aims at controlling the strength of a tumble flow of the in-cylinder gas, instead of controlling the ignition timing IG in the first embodiment, to make the actual MFB50 equal to the target MFB50.

Figure 13:
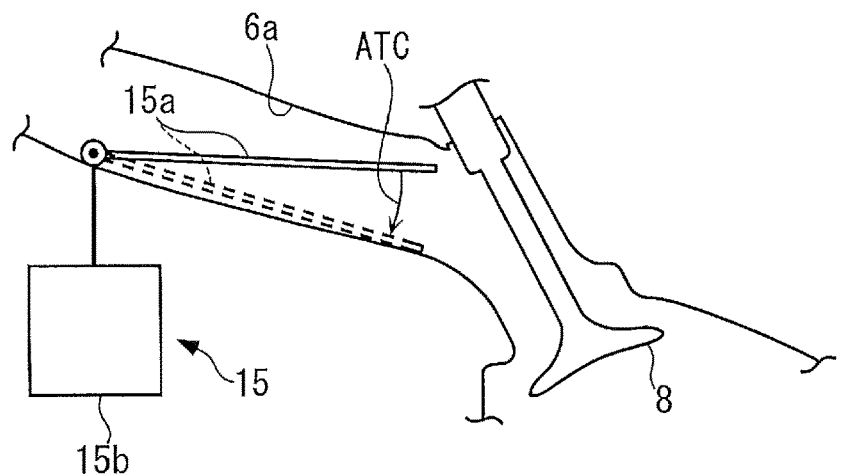
FIG. 13 is a diagram schematically illustrating a tumble flow controlling mechanism.

FIG. 13 illustrates a tumble flow controlling mechanism 15 that controls the strength of the tumble flow. The tumble flow controlling mechanism 15 includes: a turnable tumble control valve 15a disposed in each intake port 6a; and a tumble actuator 15b connected to the tumble control valve 15a. The tumble control valve 15a turns between a minimum open angle indicated with solid lines and a maximum open angle indicated with broken lines.

When the open angle ATC of the tumble control valve 15a (hereinafter referred to as a "tumble open angle ATC") is smallest, the tumble flow is increased to its maximum by reducing the passage area of the intake port 6a to its minimum. As the tumble open angle ATC becomes larger, the tumble flow becomes weaker. The operation of the tumble actuator 15b is controlled by the ECU 2. Furthermore, the tumble open angle ATC is detected by a tumble open angle sensor 28, and a signal representing the detection is inputted into the ECU 2 (see FIG. 2).

Depending on the detection signals from the sensors 21 to 27 and the tumble open angle sensor 28, the ECU 2 performs a process of calculating the tumble open angle ATC for controlling the actual MFB50 such that the actual MFB50 becomes equal to the target MFB50. In this embodiment, an in-cylinder flow controller is implemented using the tumble flow controlling mechanism 15 and the ECU 2. Furthermore, the ECU 2 functions as the combustion condition parameter obtaining unit, the fuel ratio parameter obtaining unit, the target value setting unit, a flow control parameter calculator, the storage, and the base value update unit.

Figure 14:
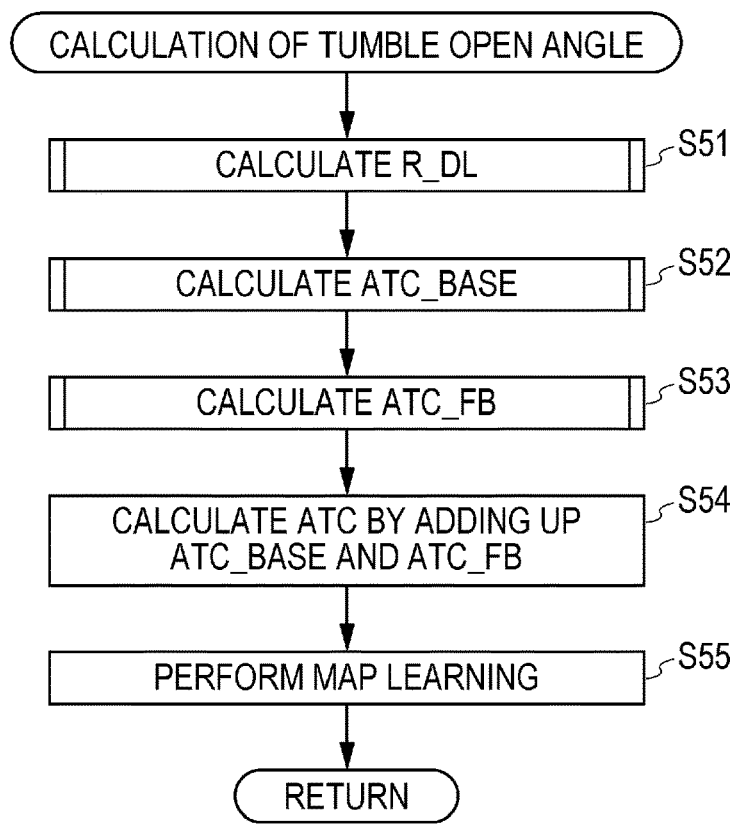
FIG. 14 is a flowchart illustrating a main flow of a process of calculating a tumble open angle in a second embodiment.

FIG. 14 illustrates a process of calculating the tumble open angle ATC. In each cylinder 3a, this process is performed in synchronization with the generation of the TDC signal. This process is basically the same as the process of calculating the ignition timing IG in the first embodiment illustrated in FIG. 3, except that the tumble open angle ATC is calculated instead of the ignition timing IG. For this reason, the process will be discussed by referring to the descriptions provided for the calculation process in the first embodiment depending on the necessity whenever discussing what is common to the calculation process in the first embodiment.

This process begins with step S51, where like in step S1 in FIG. 3, the dilution ratio R_DL of the in-cylinder gas is calculated according to the calculation process illustrated in FIG. 4.

Figure 15:
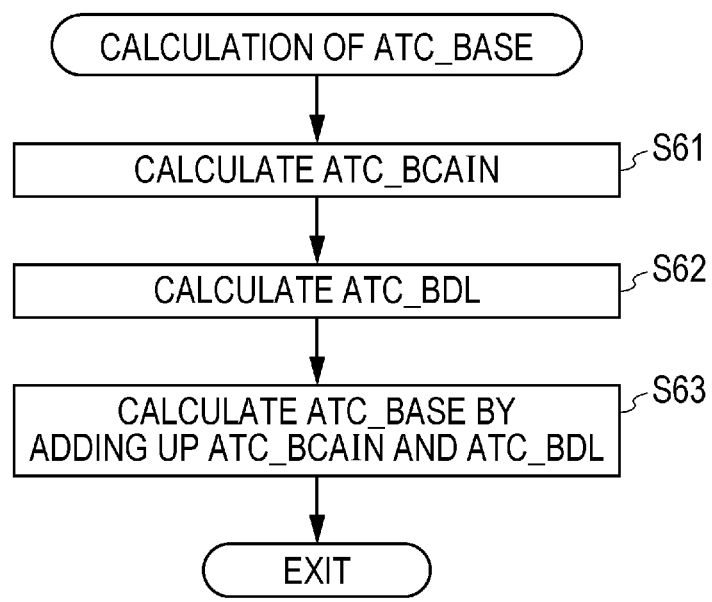
FIG. 15 is a flowchart illustrating a process of calculating a base value of the tumble open angle.

In step S52, a base value ATC_BASE (a feedforward term) of the tumble open angle ATC is calculated according to a calculation process illustrated in FIG. 15. What is performed in the calculation process is basically the same as what is performed in the calculation process illustrated in FIG. 5. To put it specifically, in this process, in step S61, a base map value ATC_BCAIN is calculated by searching a base map (not illustrated), similar to that illustrated in FIG. 6, depending on the engine speed NE and the intake phase CAIN. The base map value ATC_BCAIN is set under the condition that: the air-fuel ratio is equal to the theoretical air-fuel ratio; and the in-cylinder gas is not diluted with the EGR gas.

Thereafter, a dilution correction term ATC_BDL is calculated by searching a dilution correction map (not illustrated), similar to that illustrated in FIG. 7, depending on the engine speed NE and the dilution ratio R_DL (in step S62). In the dilution correction map, the dilution correction term ATC_BDL is set at a smaller value (in the angle reduction direction) as the dilution ratio R_DL becomes higher. This is because the tumble control valve 15a is closed more since the flow strength of the in-cylinder gas is required to be larger as the fuel ratio of the in-cylinder gas becomes lower.

Subsequently, the base value ATC_BASE of the tumble open angle ATC is calculated by adding the dilution correction term ATC_BDL to the base map value ATC_BCAIN (in step S63), and this process is terminated.

Figure 16:
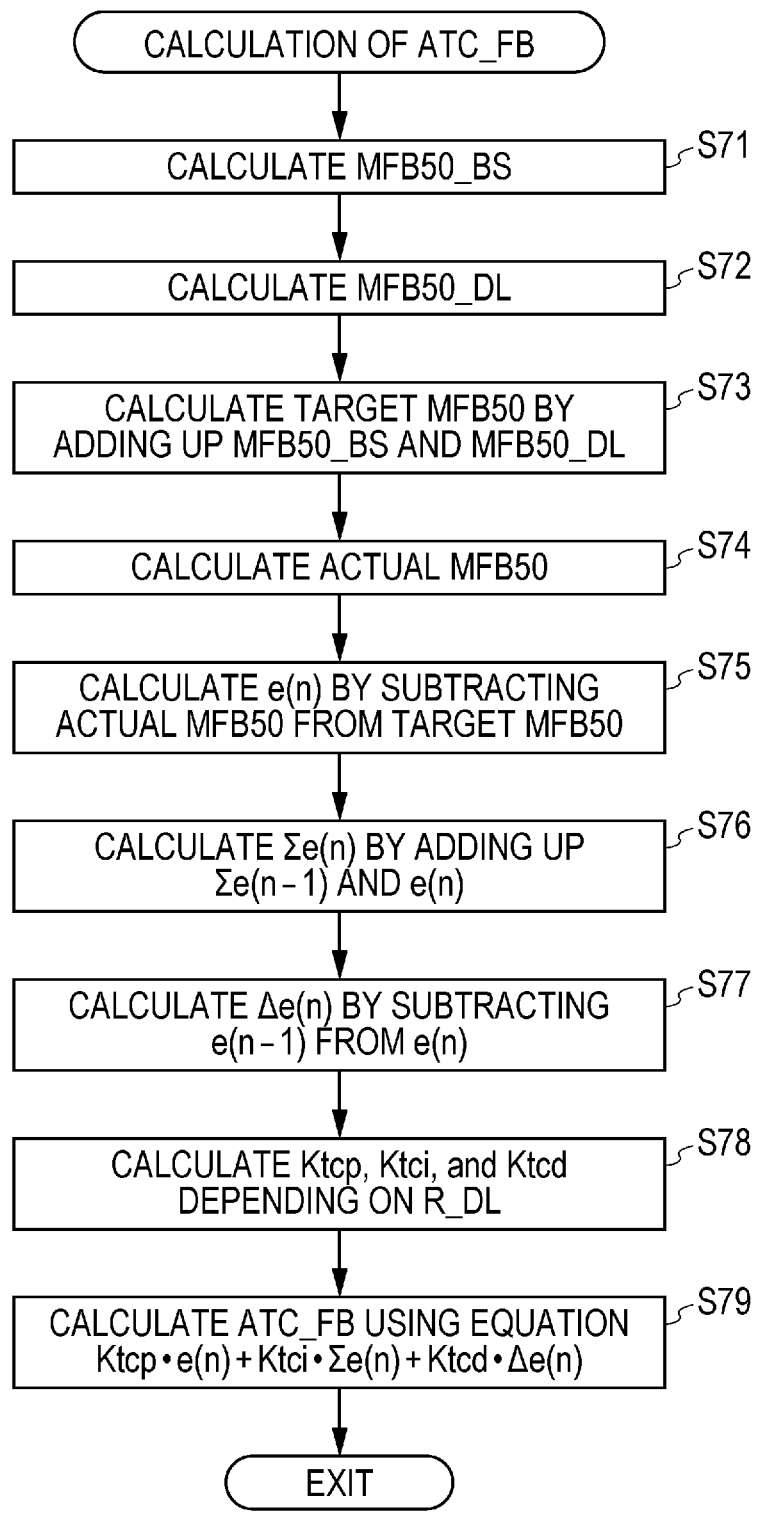
FIG. 16 is a flowchart illustrating a process of calculating a feedback correction term for the tumble open angle.

Returning to FIG. 14, in step S53 following step S52, a feedback correction term ATC_FB for the tumble open angle ATC is calculated according to a calculation process illustrated in FIG. 16. Steps S71 to S77 in this calculation process are basically the same as steps S31 to S37 illustrated in FIG. 8. To begin with, in steps S71 to S73, the base map value MFB50_BS, the dilution correction term MFB50_DL and the target MFB50 are calculated, like in step S31 to S33. Furthermore, in step S74, the actual MFB50 is calculated. The calculation of the actual MFB50 is achieved based on a result of the detection by the in-cylinder pressure sensor 21 in the same way as described above.

After that, in step S75 to S77, the deviation e(n) of the actual MFB50 from the target MFB50, the sum value Σe(n) of the deviation e(n), and the deviation change amount Δe(n) are calculated, like in steps S35 to S37.

Figure 17:
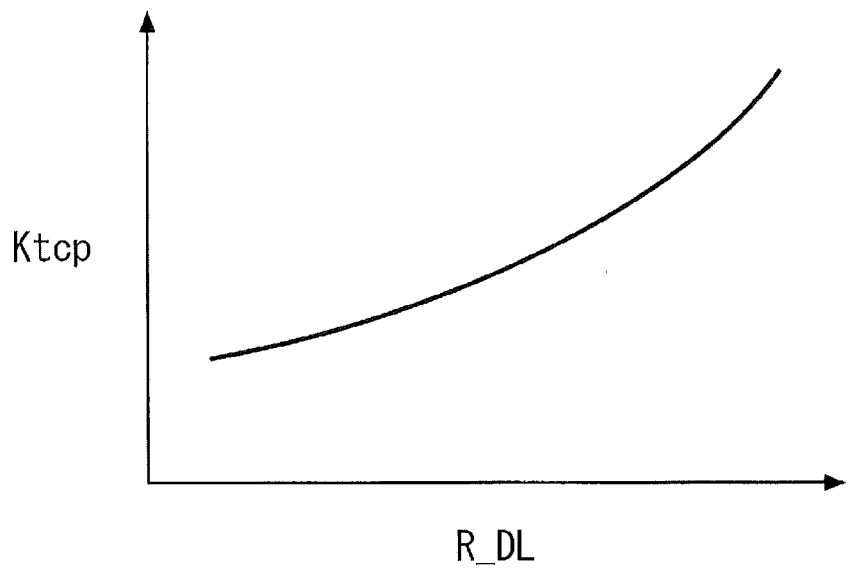
FIG. 17 is a table for calculating a P term gain in a feedback control for calculating the tumble open angle.

Subsequently, a P term gain Ktcp, an I term gain Ktca and a D term gain Ktcd for calculating the tumble open angle ATC are calculated by searching their respective predetermined tables depending on the dilution ratio R_DL (in step S78). In a table shown as an example in FIG. 17, for the purpose of enhancing the responsiveness of the feedback control, the P term gain Ktcp is set at a larger value as the dilution ratio R_DL becomes larger. For the same reason, each of the I term gain Ktci and the D term gain Ktcd, albeit not illustrated, is also set at a larger value as the dilution ratio R_DL becomes larger.

Subsequently, using the thus-calculated gains Ktcp, Ktci, Ktcd, the feedback correction term ATC_FB for the tumble open angle ATC is calculated using an equation expressed with $$ATC\_FB = Ktcp \cdot e(n) + Ktci \cdot \Sigma e(n) + Ktcd \cdot \Delta e(n) \quad (3)$$

(in step S79), and the process is terminated.

Returning to FIG. 14, in step S54 following step S53 discussed above, the tumble open angle ATC is calculated by adding the feedback correction term ATC_FB to the base value ATC_BASE.

Eventually, map learning is carried out in step S55, and the process is terminated. The purpose of the learning process is to update one of the base map defining the base map value ATC_BCAIN and the dilution correction map defining the dilution correction term ATC_BDL, which are used to calculate the base value ATC_BASE for the tumble open angle ATC. This map learning, albeit not illustrated, is performed in the same way as the learning process illustrated in FIG. 12.

To put it specifically, when the EGR flag F_EGR is 0 (zero), that is to say, when the in-cylinder gas is not diluted with the EGR gas, the base map is updated. The updating of the base map is achieved, for example, by: multiplying the currently-calculated feedback correction term ATC_FB by a predetermined coefficient KL2 (0<KL2<1); and adding the obtained multiplication value ATC_FB·KL2 to a map value ATC_BCAINij associated with the current engine speed NE and intake phase CAIN in the base map.

On the other hand, when the EGR flag F_EGR is 1 (one), that is to say, when the in-cylinder gas is diluted with the EGR gas, the dilution correction map is updated. The updating of the dilution correction map is achieved, for example, by: adding the multiplication value ATC_FB·KL2 to a map value ATC_BDLij associated with the current engine speed NE and dilution ratio R_DL in the dilution correction map.

As discussed above, in the embodiment, the actual MFB50 is calculated using the MFB50 as the combustion condition parameter, as well as the target MFB50 is set. Thereafter, the tumble open angle ATC of the tumble control valve 15a that controls the strength of the flow of the in-cylinder gas is calculated using the feedback control such that the actual MFB50 becomes equal to the target MFB50. Accordingly, the actual MFB50 can be accurately controlled such that the actual MFB50 becomes equal to the target MFB50.

Furthermore, like in the first embodiment, the target MFB50 is set as the sum of the base map value MFB50_BS and the dilution correction term MFB50_DL, and the dilution correction term MFB50_DL is calculated to a larger value in the advance angle direction as the dilution ratio R_DL becomes larger, that is to say, as the fuel ratio of the in-cylinder gas becomes lower. Thereby, the target MFB50 can be appropriately set such that a decrease in the burning velocity due to the decrease in the fuel ratio of the in-cylinder gas is compensated for. Moreover, the base map value MFB50_BS is calculated depending on the engine speed NE and the intake phase CAIN. Accordingly, the target MFB50 can be appropriately set depending on the fuel ratio of the in-cylinder gas and the operating condition of the engine 3.

Thus, the fuel mileage and the exhaust gas characteristics can be enhanced.

Besides, the ignition timing IG is calculated as the sum of the base value ATC_BASE and the feedback correction term ATC_FB which is calculate to make the actual MFB50 become equal to the target MFB50. In addition, the base value ATC_BASE is calculated as the sum of the base map value ATC_BCAIN and the dilution correction term ATC_BDL, and the dilution correction term ATC_BDL is calculated to a smaller value (in the angle reduction direction) as the dilution ratio R_DL becomes larger. Thereby, it is possible to appropriately calculate the base value ATC_BASE of the tumble open angle ATC while reflecting the flow strength required depending on the fuel ratio, and to enhance the responsiveness of the tumble open angle ATC-based feedback control using the base value ATC_BASE and the feedback correction term ATC_FB.

In addition, the base map value ATC_BCAIN stored in the base map, or the dilution correction term ATC_BDL stored in the dilution correction map is updated based on the feedback correction term IG_FB. Thereby, it is possible to appropriately correct the deviation of the base value ATC_BASE from the proper value, and to enhance the responsiveness of the tumble open angle ATC-based feedback control further.

It should be noted that present disclosure is not necessarily limited to the above-discussed first and second embodiments, and may include various modes. For example, in the two embodiments, the MFB50 (referring to the crank angle at which the mass fraction of burned fuel is 50%) is used as the combustion condition parameter representing the combustion condition. However, the combustion condition parameter is not limited to the MFB50, and instead a different parameter may be used as the combustion condition parameter. For example, a crank angle at which the mass fraction of burned fuel is a predetermined ratio other than 50% (for example, MFB10 representing a crank angle at which the mass fraction of burned fuel is 10%) may be used as the combustion condition parameter. Otherwise, a mass fraction of burned fuel to occur until the crank angle reaches a predetermined number of degrees may be used as the combustion condition parameter. A maximum in-cylinder pressure PCYLMAX presenting a maximum value of the in-cylinder pressure PCYL, a maximum in-cylinder pressure angle representing a crank angle at which the in-cylinder pressure PCYL is a maximum, or the like may be also used as the combustion condition parameter.

Furthermore, in the second embodiment, the tumble flow controlling mechanism 15 that controls the strength of the tumble flow of the in-cylinder gas is used as the in-cylinder flow controller that controls the strength of the flow of the in-cylinder gas. Instead, however, a swirl flow controller that controls the strength of a swirl flow of the in-cylinder gas, an injection pressure controller that controls the pressure at which the fuel is injected into the cylinder 3a, an injection timing controller that controls the timing at which the fuel is injected into the cylinder 3a, or the like may be used as the in-cylinder flow controller. These controllers are capable of controlling the strength of the flow of the in-cylinder gas by changing their respective flow control parameters (for example, the open angle of a swirl control valve, the injection pressure and the injection timing). For this reason, the effect brought about by the second embodiment can be obtained from such controllers as well.

Furthermore, in the embodiments, the proportional integral and derivative (PID) control is used as the feedback control. It is a matter of course, however, that a sliding mode control or the like may be instead used as the feedback control.

Moreover, the embodiments are the examples where the present disclosure is applied to the vehicle gasoline engine. However, the present disclosure is not necessarily limited to the vehicle gasoline engine. The present disclosure is applicable to an engine of a different type, for example a diesel engine, and to an engine for a different use purpose, for example an engine for a ship propeller, such as an outboard motor with a crankshaft oriented in the vertical direction. The second embodiment in the present disclosure is useful for the diesel engine in particular, since the second embodiment controls the combustion condition regardless of the ignition timing. Changes may be made to the detailed configuration depending on the necessity within the scope of the gist of the present disclosure.

A first aspect of the present disclosure describes a controller for an internal combustion engine including a combustion condition parameter obtaining unit that obtains a combustion condition parameter representing a combustion condition of an in-cylinder gas injected into a cylinder in an internal combustion engine, a fuel ratio parameter obtaining unit that obtains a fuel ratio parameter representing a fuel ratio of the in-cylinder gas, a target value setting unit that sets a target value for the combustion condition parameter depending on the obtained fuel ratio parameter, and an ignition timing calculator that calculates ignition timing using a feedback control such that the combustion condition parameter becomes equal to the set target value.

According to the first aspect of the present disclosure, the combustion condition parameter representing the combustion condition of the in-cylinder gas is obtained, and the target value for the combustion condition parameter is set. In addition, the ignition timing is calculated using the feedback control such that the obtained combustion condition parameter becomes equal to the target value. Thereby, an actual combustion condition is accurately controlled to meet a target combustion condition.

In addition, according to the first aspect of the present disclosure, the fuel ratio parameter representing the fuel ratio of the in-cylinder gas is obtained, and the target value for the combustion condition parameter is set depending on the obtained fuel ratio parameter. This configuration is based on the following technical viewpoints.

Figure 18:
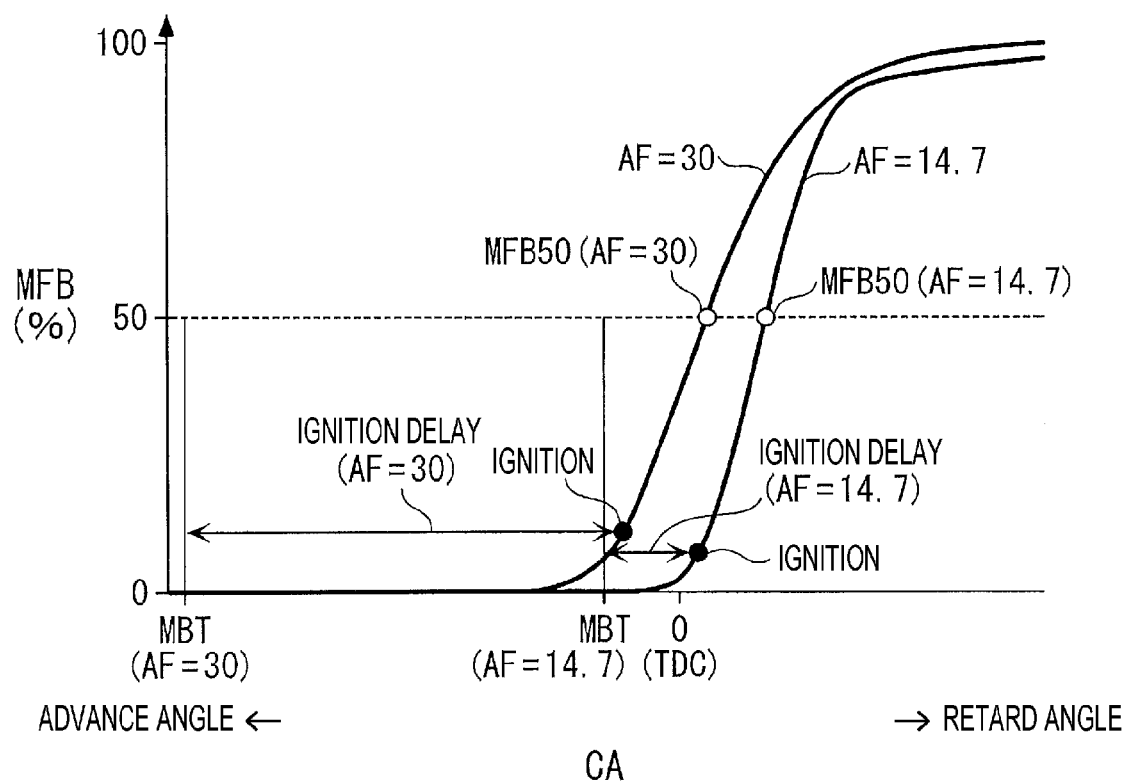
FIG. 18 is a diagram illustrating a relationship between optimal ignition timing and a mass fraction of burned fuel for each of two air-fuel ratios.

For example, FIG. 18 illustrates shifts of a minimum advance for best torque MBT and a mass fraction of burned fuel (MFB) in cases where the air-fuel ratio AF of the in-cylinder gas is 14.7 (theoretical air-fuel ratio) and 30 (very lean air-fuel fuel ratio). Here, the minimum advance for best torque MBT is an ignition timing that maximizes output torque from the internal combustion engine. As demonstrated in FIG. 18, the minimum advance for best torque MBT at the AF of 30 greatly shifts in the advance angle direction from the minimum advance for best torque MBT at the AF of 14.7. This is because: a lower fuel ratio makes the in-cylinder gas harder to combust; when the fuel ratio is very low, a considerably large ignition delay occurs between the ignition operation and an ignition, and accordingly an ignition operation needs to start earlier.

Furthermore, the MFB at the AF of 30 starts to rise earlier and increases more gently than the MFB at the AF of 14.7, and a crank angle corresponding to a 50-percent MFB (hereinafter referred to as an "MFB50") at the AF of 30 shifted in the advance angle direction from the MFB50 at the AF of 14.7. This is because an optimal MFB50 is shifted further in the advance angle direction, since the lower fuel ratio makes the in-cylinder gas harder to combust, and accordingly makes a burning velocity lower and a burning period longer. For this reason, in the case where the MFB50 is used as the combustion condition parameter representing the combustion condition, the target value for the MFB50 needs to be set depending on the fuel ratio in order to achieve the optimal MFB50.

Figure 19:
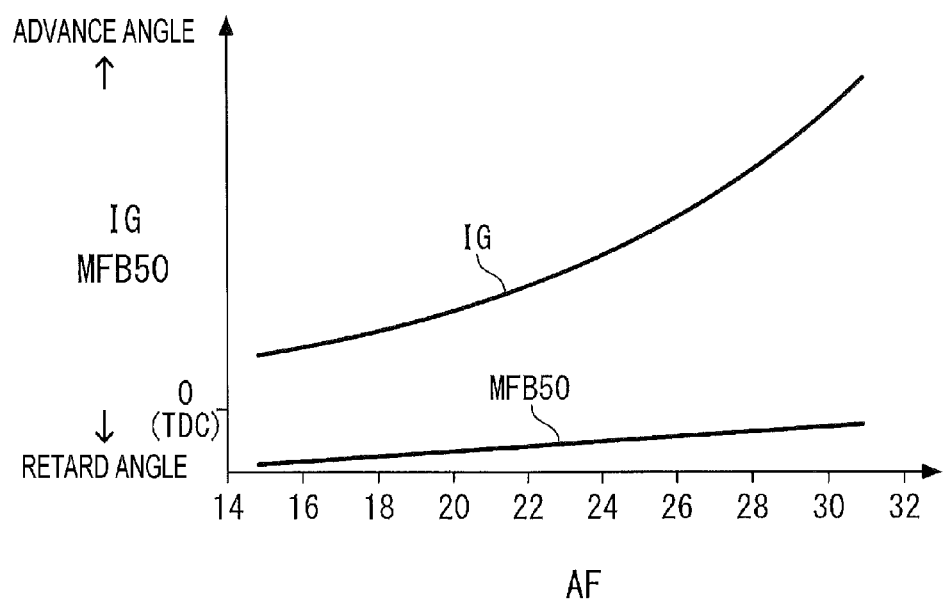
FIG. 19 is a diagram illustrating a relationship among an air-fuel ratio, an optimal MFB50 and the ignition timing.

FIG. 19 illustrates a relationship among the air-fuel ratio AF, the minimum advance for best torque MBT and the optimal MFB50 which occurs in a range of an air-fuel ratio leaner than the theoretical air-fuel ratio. For the above-discussed reasons, as the fuel ratio of the in-cylinder gas becomes lower with an increase in the air-fuel ratio AF, a shift of the minimum advance for best torque MBT in the advance angle direction becomes larger, whereas the optimal MFB50 gradually changes in the advance angle direction.

The foregoing configuration in the first aspect of the present disclosure is designed in light of the relationship between the fuel ratio of the in-cylinder gas and the combustion condition. The configuration makes it possible to appropriately set the target value for the combustion condition parameter depending on the fuel ratio of the in-cylinder gas by setting the target value depending on the obtained fuel ratio parameter. Since the ignition timing is calculating using the feedback control such that the combustion condition parameter becomes equal to the set target value, the actual combustion condition can be accurately controlled to meet the appropriately-set target combustion condition. Thus, the fuel mileage and the exhaust gas characteristics can be enhanced.

In the controller for an internal combustion engine according to the first aspect of the present disclosure, a second aspect of the present disclosure describes the ignition timing calculator calculating a base value of the ignition timing depending on the fuel ratio parameter, calculating a feedback correction value based on the feedback control, and calculating the ignition timing using the calculated base value and the calculated feedback correction value.

According to the second aspect of the present disclosure, the ignition timing is calculated using the base value of the ignition timing and the feedback correction value based on the feedback control. In addition, the base value of the ignition timing is calculated depending on the fuel ratio parameter. As discussed above, the lower fuel ratio of the in-cylinder gas makes the ignition delay longer, and the minimum advance for best torque is accordingly shifted in the advance angle direction. Thus, the above-discussed configuration makes it possible to appropriately calculate the base value of the ignition timing while reflecting the ignition delay depending on the fuel ratio, and to enhance responsiveness of the ignition timing-based feedback control using the base value and the feedback correction value.

In the controller for an internal combustion engine according to the second aspect of the present disclosure, a third aspect of the present disclosure describes the controller for an internal combustion engine further including a storage that stores the base value of the ignition timing, and a base value update unit that updates the base value stored in the storage, based on the feedback correction value.

According to the configuration in the third aspect of the present disclosure, the base value of the ignition timing is stored in the storage, and the calculation is performed by reading the base value thereof from the storage. Furthermore, the base value stored in the storage is updated based on the feedback correction value. The feedback correction value reflects a deviation of the base value from an appropriate value obtained when the ignition timing is calculated by the feedback control such that the combustion condition parameter becomes equal to the target value. For this reason, the deviation of the base value can be appropriately corrected by updating the base value based on the feedback correction value. Thereby, the responsiveness of the ignition timing-based feedback control can be enhanced further.

A fourth aspect of the present disclosure describes a controller for an internal combustion engine including an in-cylinder flow controller that controls strength of a flow of an in-cylinder gas injected into a cylinder in an combustion engine by updating a flow control parameter, a combustion condition parameter obtaining unit that obtains a combustion condition parameter representing a combustion condition of the in-cylinder gas, a fuel ratio parameter obtaining unit that obtains a fuel ratio parameter representing a fuel ratio of the in-cylinder gas, a target value setting unit that sets a target value for the combustion condition parameter depending on the obtained fuel ratio parameter, and a flow control parameter calculator that calculates the flow control parameter for the in-cylinder flow controller using a feedback control such that the combustion condition parameter becomes equal to the set target value.

The controller for an internal combustion engine according to the fourth aspect of the present disclosure includes an in-cylinder flow controller, and controls the combustion condition by: changing the flow control parameter; and thereby controlling the strength of the flow of the in-cylinder gas. According to the fourth aspect of the present disclosure, the combustion condition parameter representing the combustion condition of the in-cylinder gas is obtained, and the target value for the combustion condition parameter is set, like in the first aspect of the present disclosure. Furthermore, the flow control parameter is calculated using the feedback control such that the obtained combustion condition parameter becomes equal to the target value. Thereby, the actual combustion condition is accurately controlled to meet the target combustion condition.

Figure 20:
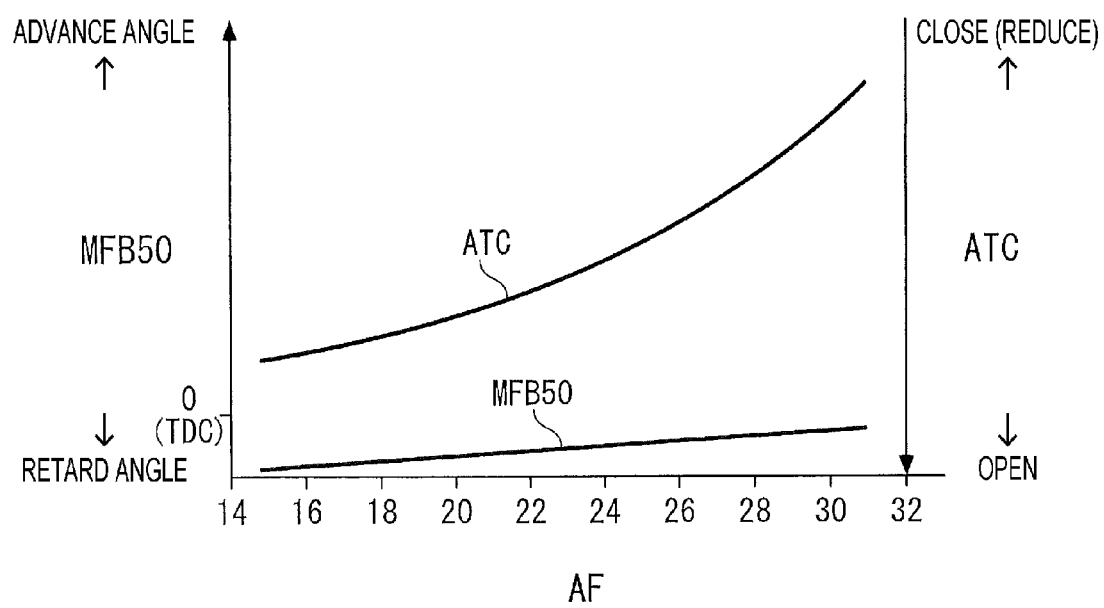
FIG. 20 is a diagram illustrating a relationship among the air-fuel ratio, the optimal MFB50 and the tumble open angle.

FIG. 20 illustrates a relationship among the air-fuel ratio AF, the MFB50 that maximizes output torque from the internal combustion engine, and the open angle of the tumble control value (hereinafter referred to as a "tumble open angle") ATC which occurs in a range of an air-fuel ratio leaner than the theoretical air-fuel ratio. An optimal MFB50 enabling the maximum output torque to be obtained gradually changes in the advance angle direction, as the air-fuel ratio AF becomes higher and the fuel ratio of the in-cylinder gas becomes lower. Meanwhile, an optimal tumble open angle ATC enabling the maximum output torque to be obtained changes non-linearly to a large extent in an angle reduction direction, as the air-fuel ratio AF becomes higher. This is because for the purpose of increasing the burning velocity to secure the optimal MFB50, the strength of the flow of the in-cylinder gas needs to be increased by largely reducing the tumble open angle ATC, taking it into consideration that a lower fuel ratio of the in-cylinder gas tends to make the burning velocity lower.

According to fourth aspect of the present disclosure, with the above relationship taken into consideration, the target value for the combustion condition parameter is set depending on the fuel ratio parameter. Thereby, the target value for the combustion condition parameter is appropriately set depending on the fuel ratio of the in-cylinder gas. Since the flow control parameter for the in-cylinder flow controller is calculated using the feedback control such that the combustion condition parameter becomes equal to the target value, the actual combustion condition can be accurately controlled to meet the appropriately-set target combustion condition. Accordingly, the fuel mileage and the exhaust gas characteristics can be enhanced.

In the controller for an internal combustion engine according to the fourth aspect of the present disclosure, a fifth aspect of the present disclosure describes the controller for an internal combustion engine further including an operating condition detector that detects an operating condition of the internal combustion engine. Here, the target value setting unit sets the target value depending on the fuel ratio parameter and the detected operating condition of the internal combustion engine.

As discussed above, the optimal combustion condition changes depending on not only the fuel ratio of the in-cylinder gas but also the operating condition of the internal combustion engine, for example, the engine speed of the internal combustion engine. According to the fifth aspect of the present disclosure, with this relationship taken into consideration, the target value for the combustion condition parameter is set depending on the fuel ratio parameter and the detected operating condition of the internal combustion engine. Thereby, the target value for the combustion condition parameter can be set more appropriately, and a much better combustion condition can be obtained.

In the controller for an internal combustion engine according to the fourth or fifth aspect of the present disclosure, a sixth aspect of the present disclosure describes the flow control parameter calculator calculating a base value of the flow control parameter depending on the fuel ratio parameter, calculating a feedback correction value based on the feedback control, and calculating the flow control parameter using the calculated base value and the calculated feedback correction value.

According to configuration of the sixth aspect of the present disclosure, the flow control parameter is calculated using the base value of the flow control parameter and the feedback correction value based on the feedback control. Meanwhile, the base value of the flow control parameter is calculated depending on the fuel ratio parameter. Since as discussed, the lower fuel ratio of the in-cylinder gas makes the required flow strength of the in-cylinder gas larger, the flow control parameter is required to satisfy the larger flow strength. Thus, according to the configuration, the base value of the flow control parameter can be appropriately calculated while reflecting the flow strength required depending on the fuel ratio, and responsiveness of the flow control parameter-based feedback control using the base value and the feedback correction value can be enhanced.

In the controller for an internal combustion engine according to the sixth aspect of the present disclosure, a seventh aspect of the present disclosure describes further including a storage that stores the base value of the flow control parameter, and a base value update unit that updates the base value stored in the storage, based on the feedback correction value.

According to seventh aspect of the present disclosure, the base value of the flow control parameter is stored in the storage, and the calculation is performed by reading the base value thereof from the storage. Furthermore, the base value stored in the storage is updated based on the feedback correction value. The feedback correction value reflects how much the base value deviates from an appropriate value when the flow control parameter is calculated by the feedback control such that the combustion condition parameter becomes equal to the target value. For this reason, the deviation of the base value can be appropriately corrected by updating the base value based on the feedback correction value. Thereby, the responsiveness of the flow control parameter-based feedback control can be enhanced further.

In the controller for an internal combustion engine according to any one of the fourth to seventh aspects of the present disclosure, an eighth aspect of the present disclosure describes the in-cylinder flow controller being any one of a tumble flow controller that controls strength of a tumble flow of the in-cylinder gas, a swirl flow controller that controls strength of a swirl flow of the in-cylinder gas, an injection pressure controller that controls a pressure at which fuel is injected into the cylinder, and an injection timing controller that controls timing at which fuel is injected into the cylinder The foregoing four controllers (the tumble flow controller, the swirl flow controller, the injection pressure controller and the injection timing controller) all are capable of controlling the strength of the flow of the in-cylinder gas by changing the their respective flow control parameters (for example, the open angle of the tumble control valve, the open angle of the swirl control valve, the injection pressure and the injection timing). For this reason, use of one of these controllers as the in-cylinder flow controller makes it possible to obtain the same effects as discussed with respect of the fourth to seventh aspects of the present disclosure.

In the controller for an internal combustion engine according to the first to eighth aspect of the present application, a ninth aspect of the present disclosure describes further including an in-cylinder pressure sensor that detects an in-cylinder pressure. Here, the combustion condition parameter obtaining unit may obtain a crank angle at which a mass fraction of burned fuel is 50%, as the combustion condition parameter, based on a result of the detection by the in-cylinder pressure sensor.

The crank angle at which the above-mentioned mass fraction of burned fuel is 50% (hereinafter referred to as an "MFB50") corresponds to the center of the combustion period, and is an important indicator preferably representing the combustion condition. For this reason, the MFB50 is used as the combustion condition parameter; the actual MFB50 is calculated using the result of the detection by the in-cylinder pressure sensor; and the feedback control is performed such that the calculated actual MFB50 becomes equal to the target value. This makes it possible to appropriately control the combustion condition of the in-cylinder gas to meet the desired combustion condition. Furthermore, since as discussed above, the optimal MFB50 enabling the maximum output torque to be obtained from the internal combustion engine changes depending on the fuel ratio of the in-cylinder gas, the setting of the target value for the MFB50 depending on the fuel ratio makes it possible to preferably obtain the same effects as discussed with respect of the first to eighth aspects of the disclosure.

Obviously, numerous modifications and variations of the present invention are possible in light of the above teachings. It is therefore to be understood that within the scope of the appended claims, the invention may be practiced otherwise than as specifically described herein.

What is claimed is:

1. A controller for an internal combustion engine comprising:
   a combustion condition parameter obtaining unit that obtains a combustion condition parameter representing a combustion condition of an in-cylinder gas injected into a cylinder in an internal combustion engine;
   a fuel ratio parameter obtaining unit that obtains a fuel ratio parameter representing a fuel ratio of the in-cylinder gas;
   a target value setting unit that sets a target value for the combustion condition parameter depending on the obtained fuel ratio parameter;
   an ignition timing calculator that calculates ignition timing using a feedback control such that the combustion condition parameter becomes equal to the set target value; and
   an ignition controller that controls an ignition plug to ignite at the ignition timing.

2. The controller according to claim 1, wherein
   the ignition timing calculator
   calculates a base value of the ignition timing depending on the fuel ratio parameter,
   calculates a feedback correction value based on the feedback control, and
   calculates the ignition timing using the calculated base value and the calculated feedback correction value.

3. The controller according to claim 2, further comprising:
   a storage that stores the base value of the ignition timing; and
   a base value update unit that updates the base value stored in the storage, based on the feedback correction value.

4. A controller for an internal combustion engine comprising:
   an in-cylinder flow controller that controls a tumble control valve to control strength of a flow of an in-cylinder gas injected into a cylinder in a combustion engine by updating a flow control parameter;
   a combustion condition parameter obtaining unit that obtains a combustion condition parameter representing a combustion condition of the in-cylinder gas;
   a fuel ratio parameter obtaining unit that obtains a fuel ratio parameter representing a fuel ratio of the in-cylinder gas;
   a target value setting unit that sets a target value for the combustion condition parameter depending on the obtained fuel ratio parameter;
   a flow control parameter calculator that calculates the flow control parameter for the in-cylinder flow controller using a feedback control such that the combustion condition parameter becomes equal to the set target value.

5. The controller according to claim 4, further comprising:
   an operating condition detector that detects an operating condition of the internal combustion engine, wherein
   the target value setting unit sets the target value depending on the fuel ratio parameter and the detected operating condition of the internal combustion engine.

6. The controller according to claim 4, wherein
   the flow control parameter calculator
   calculates a base value of the flow control parameter depending on the fuel ratio parameter,
   calculates a feedback correction value based on the feedback control, and
   calculates the flow control parameter using the calculated base value and the calculated feedback correction value.

7. The controller according to claim 6, further comprising:
   a storage that stores the base value of the flow control parameter; and
   a base value update unit that updates the base value stored in the storage, based on the feedback correction value.

8. The controller according to claim 4, wherein
   the in-cylinder flow controller is any one of
   a tumble flow controller that controls strength of a tumble flow of the in-cylinder gas,
   a swirl flow controller that controls strength of a swirl flow of the in-cylinder gas,
   an injection pressure controller that controls a pressure at which fuel is injected into the cylinder, and
   an injection timing controller that controls timing at which fuel is injected into the cylinder.

9. The controller according to claim 1,
   further comprising an in-cylinder pressure sensor that detects an in-cylinder pressure, wherein
   the combustion condition parameter obtaining unit obtains a crank angle at which a mass fraction of burned fuel is 50%, as the combustion condition parameter, based on a result of the detection by the in-cylinder pressure sensor.

10. The controller according to claim 4,
    further comprising an in-cylinder pressure sensor that detects an in-cylinder pressure, wherein
    the combustion condition parameter obtaining unit obtains a crank angle at which a mass fraction of burned fuel is 50%, as the combustion condition parameter, based on a result of the detection by the in-cylinder pressure sensor.

11. A controller for an internal combustion engine, comprising:
    a detector to detect a combustion condition of a gas in a cylinder of the internal combustion engine; and
    a processor configured to
    calculate a fuel ratio in the gas in the cylinder;
    calculate a target combustion condition according to the fuel ratio;

calculate an ignition timing such that the combustion condition detected by the detector becomes equal to the target combustion condition; and control an ignition plug to ignite at the ignition timing.

12. The controller according to claim 11, wherein the processor is configured to calculate the ignition timing with a feedback control.

13. The controller according to claim 12, wherein the processor is configured to
calculate a combustion condition parameter representing the combustion condition detected by the detector;
calculate a fuel ratio parameter representing the fuel ratio;
calculate a target value representing the target combustion condition according to the fuel ratio parameter; and
calculate the ignition timing such that the combustion condition parameter becomes equal to the target value.

14. The controller according to claim 13, wherein the processor is configured to
calculate a base value of the ignition timing depending on the fuel ratio parameter;
calculate a feedback correction value based on the feedback control; and
calculate the ignition timing using the calculated base value and the calculated feedback correction value.

15. The controller according to claim 14, further comprising:
a storage to store the base value of the ignition timing; and
a base value update unit to update the base value stored in the storage, based on the feedback correction value.

16. The controller according to claim 13,
further comprising a pressure sensor to detect a pressure in the cylinder, wherein
the processor is configured to obtain a crank angle at which a mass fraction of burned fuel is 50%, as the combustion condition parameter, based on a result of a detection by the pressure sensor.

17. A controller for an internal combustion engine, comprising:
a detector to detect a combustion condition of a gas in a cylinder of the internal combustion engine;
a processor configured to
calculate a fuel ratio in the gas in the cylinder;
calculate a target combustion condition according to the fuel ratio; and
calculate a flow control parameter such that the combustion condition detected by the detector becomes equal to the target combustion condition; and
a flow controller to control a tumble control valve to control strength of flow of the gas in the cylinder by updating the flow control parameter.

18. The controller according to claim 17, wherein the processor is configured to calculate the flow control parameter with a feedback control.

19. The controller according to claim 18, wherein the processor is configured to
calculate a combustion condition parameter representing the combustion condition detected by the detector;
calculate a fuel ratio parameter representing the fuel ratio;
calculate a target value representing the target combustion condition according to the fuel ratio parameter; and
calculate the flow control parameter such that the combustion condition parameter becomes equal to the target value.

20. The controller according to claim 19, further comprising:

an operating condition detector to detect an operating condition of the internal combustion engine, wherein
the processor is configured to calculate the target value according to the fuel ratio parameter and the detected operating condition of the internal combustion engine.

21. The controller according to claim 19, wherein
the processor is configured to
calculate a base value of the flow control parameter according to the fuel ratio parameter;
calculate a feedback correction value based on the feedback control; and
calculate the flow control parameter using the calculated base value and the calculated feedback correction value.

22. The controller according to claim 21, further comprising:
a storage to store the base value of the flow control parameter; and
a base value update unit to update the base value stored in the storage, based on the feedback correction value.

23. The controller according to claim 19, wherein
the flow controller is any one of
a tumble flow controller that controls strength of a tumble flow of the gas in the cylinder,
a swirl flow controller that controls strength of a swirl flow of the gas in the cylinder,
an injection pressure controller that controls a pressure at which fuel is injected into the cylinder, and
an injection timing controller that controls timing at which fuel is injected into the cylinder.

24. The controller according to claim 19,
further comprising a pressure sensor to detect a pressure in the cylinder, wherein
the processor is configured to obtain a crank angle at which a mass fraction of burned fuel is 50%, as the combustion condition parameter, based on a result of a detection by the pressure sensor.

25. A control method for an internal combustion engine, comprising:
calculating a fuel ratio in a gas in a cylinder of the internal combustion engine;
calculating a target combustion condition according to the fuel ratio; and
calculating an ignition timing such that a combustion condition of the gas in the cylinder becomes equal to the target combustion condition;
controlling an ignition plug to ignite at the ignition timing.

26. A control method for an internal combustion engine, comprising:
calculating a fuel ratio in a gas in a cylinder of the internal combustion engine;
calculating a target combustion condition according to the fuel ratio;
calculating a flow control parameter such that the combustion condition of the gas in the cylinder becomes equal to the target combustion condition; and
controlling a tumble control valve to control strength of flow of the gas in the cylinder by updating the flow control parameter.

* * * * *